US008798454B2

(12) United States Patent
Akasaka

(10) Patent No.: US 8,798,454 B2
(45) Date of Patent: Aug. 5, 2014

(54) METHOD AND SYSTEM FOR AUTOMATIC LANE NEGOTIATION IN AN OPTICAL NETWORK

(75) Inventor: Youichi Akasaka, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 431 days.

(21) Appl. No.: 12/824,998

(22) Filed: Jun. 28, 2010

(65) Prior Publication Data
US 2011/0317994 A1 Dec. 29, 2011

(51) Int. Cl.
G02F 1/00 (2006.01)
G02F 2/00 (2006.01)
H01S 3/00 (2006.01)
H04B 10/00 (2013.01)
H04J 14/00 (2006.01)
H04B 10/12 (2006.01)

(52) U.S. Cl.
USPC ............... 398/2; 398/1; 398/3; 398/4; 398/5; 398/6; 398/7; 398/8; 398/66; 398/145

(58) Field of Classification Search
None
See application file for complete search history.

(56) References Cited

U.S. PATENT DOCUMENTS 5,777,761 A * 7/1998 Fee ................................... 398/7
2006/0120718 A1* 6/2006 Natori ............................. 398/19

OTHER PUBLICATIONS

Tsujii et al.; "Electronic/Information Communication Basic Series"; Digital Transmission Network; ISBN 4-254-22786-8; pp. 3, 2000.
LAN/MAN Standards Committee of the IEEE Computer Society; "Part 3: Carrier Sense Multiple Access with Collision Detection (CSMA/CD) Access Method and Physical Layer Specifications"; IEEE P802.3ba™D2.3; pp. 443, Oct. 14, 2009.
Jiang et al.; "Multi-Lane PMD Reliability and Partial Fault Protection (PFP)"; IEEE 802.3ba Task Force; Huawei Technologies Co., Ltd.; pp. 24, Jan. 23, 2008.
Law et al.; "IEEE P802.3ba: Architecture Overview"; IEEE 802.3 Time Synchronization Protocol Study Group; Version 1.0; pp. 12, May 2009.
Zeng et al.; "PHY OAM and Lane Fault Monitoring"; IEEE 802.3ba Task Force; Huawei Technologies Co., Ltd.; pp. 16, 2008.
Takahashi et al.; "Comments on Multi-Lane PMD Reliability"; IEEE P802.3ba; KDDI R&D Labs; pp. 9, Mar. 20, 2008.
Ding et al.; "PHY Layer Monitoring"; IEEE 802.3ba Task Force; Huawei Technologies Co., Ltd.; pp. 14, 2008.

* cited by examiner

Primary Examiner — Darren E Wolf
(74) Attorney, Agent, or Firm — Baker Botts L.L.P.

(57) ABSTRACT

Systems and methods for distributing signals in an optical network are disclosed. In accordance with one embodiment of the present disclosure a method for distributing signals in an optical network comprises combining input signals into one or more output signals, determining, an availability status of optical lanes for carrying the output signals and distributing the output signals to optical transmitters associated with the optical lanes if the availability status indicates that the optical lanes are available. The method further comprises, transmitting the output signals as optical signals using the optical transmitters associated with the lanes that are available and determining that a previously available optical lane is not available for carrying the output signals, terminating distribution of the output signals to the optical transmitter associated with the lane that is not available and redistributing the output signals to the plurality of transmitters associated with the lanes that are still available.

20 Claims, 4 Drawing Sheets

METHOD AND SYSTEM FOR AUTOMATIC LANE NEGOTIATION IN AN OPTICAL NETWORK

TECHNICAL FIELD

The present invention relates generally to the field of communication systems and more specifically to automatically negotiating lanes in an optical network.

BACKGROUND OF THE INVENTION

Telecommunications systems, cable television systems and data communication networks use optical networks to rapidly convey large amounts of information between remote points. In an optical network, optical fibers connect nodes to each other and information is conveyed in the form of optical signals through the optical fibers.

Optical networks typically utilize optical transmitters (also referred to as transmitters) to transmit optical signals at specific wavelengths or channels. Multiple transmitters may be used to transmit information at multiple channels within an optical fiber.

In Ethernet applications, an optical transmitter may transmit the information associated with one or more electrical lanes at a channel to create an optical lane. Typically multiple lanes carry information between two nodes to create a link between the nodes. In conventional implementations, when a lane within a link goes down or is lost, typically due to failure of the transmitter associated with that lane, the link is deemed lost and communication between the nodes coupled by the link is lost.

SUMMARY OF THE INVENTION

In accordance with the present disclosure, disadvantages and problems associated with previous techniques for identifying a fault location in an optical network may be reduced or eliminated.

In accordance with one embodiment of the present disclosure a method for distributing signals in an optical network comprises combining, by a network element, one or more input signals into one or more output signals and determining, by the network element, an availability status of a plurality of optical lanes for carrying the output signals. The method further comprises distributing, by the network element, the output signals to a plurality of optical transmitters associated with the plurality of optical lanes. The network element distributes the output signals to the transmitters if the availability status indicates that the plurality of optical lanes are available. The method further comprises, transmitting, by the network element, the output signals as optical signals using the plurality of optical transmitters associated with the lanes that are available and determining that at least one of the previously available optical lanes is not available for carrying the output signals. The method further comprises terminating distribution of the output signals to at least one optical transmitter associated with the at least one lane that is not available for carrying the output signals and redistributing the output signals to the plurality of transmitters associated with the lanes that are still available.

In accordance with another embodiment of the present disclosure a network element comprises a multiplexer configured to combine one or more input signals into one or more output signals. The network element further comprises a network interface that comprises a plurality of optical transmitters associated with a plurality of optical lanes. The transmitters are configured to transmit the output signals as optical signals. The network element further comprises a processor communicatively coupled to the multiplexer and the network interface. The processor is configured to determine an availability status of the plurality of lanes for carrying the output signals. The network element further comprises a distributor communicatively coupled to the processor and plurality of optical transmitters. The distributor is configured to distribute the output signals to the plurality of transmitters if the availability status indicates that the plurality of optical transmitters are available. The distributor is further configured to terminate distributing the output signals to one or more of the plurality of optical transmitters if the processor determines that one or more of the optical lanes associated with the one or more optical transmitters is no longer available for carrying the output signals. The distributor is further configured to redistribute the output signals to the plurality of optical transmitters associated with the lanes that are still available.

BRIEF DESCRIPTION OF THE DRAWINGS

For a more complete understanding of the present disclosure, and the advantages thereof, reference is now made to the following written description taken in conjunction with the accompanying drawings, in which.

DETAILED DESCRIPTION OF THE INVENTION

Embodiments of the present disclosure and its advantages are best understood by referring to FIGS. 1-4, where like numbers are used to indicate like and corresponding parts.

Figure 1:
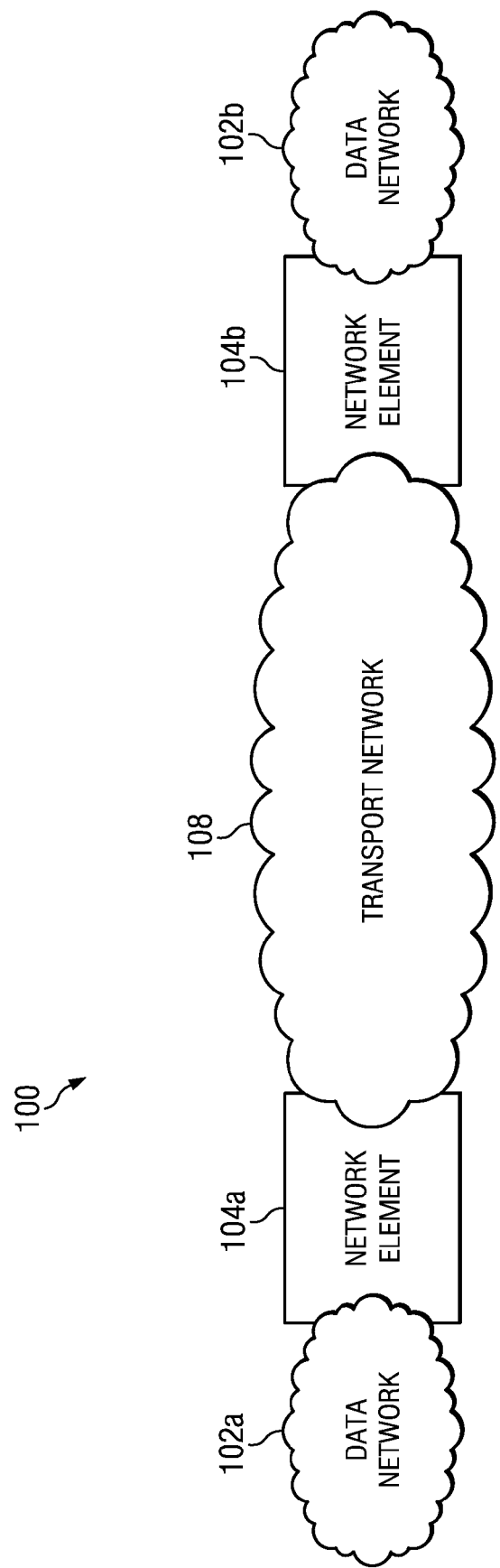
FIG. 1 illustrates an example system configured to transmit signals throughout a communication network.

FIG. 1 illustrates an embodiment of a system 100 that may comprise a communication network, with system 100 being configured to transmit signals throughout the communication network. System 100 may transmit electrical signals, optical signals, electromagnetic signals, or any combination thereof between nodes throughout the communication network. A communication network may include transmission media that communicatively couple the nodes and facilitate communication between nodes in the network. The communication of data or signals between and within nodes may be referred to as traffic.

A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline, wireless, or optical network, an enterprise internet, other suitable communication link, or any combination of the proceeding.

System 100 may also include one or more sub-networks such as one or more data networks 102a and 102b along with one or more transport networks 108.

In some embodiments, the nodes within the network may be network elements 104 that receive or transmit traffic within the network, thus communicating with each other throughout the network.

Data networks 102a and 102b may deliver traffic between adjacent nodes (e.g. between network elements 102) within a sub-network of system 100. By doing so, data networks 102a and 102b may carry network services from network providers to network customers or clients. Transport network 108 may provide connectivity between data networks 102 of different network providers.

In the present example, data network 102a may be coupled to transport network 108 via network element 104a and data network 102b may be coupled to transport network 108 via network element 104b. Network elements 104a and 104b may be communicatively coupled via transport network 108. Also, many more data networks 102 may exist, but only two are shown as an example.

As network providers service larger numbers of customers and clients within data networks 102a and 102b and the communication demands of the customers and clients increases, service providers may need higher levels of bandwidth to support the increased traffic demands. Thus, the amount of bandwidth required to communicate between service providers via transport network 108 may also increase. Further, due to the increased expansion and availability of communication networks throughout the world, the distances covered by networks such as transport network 108 may span hundreds to thousands of miles or kilometers.

In the present example, transport network 108 may comprise an optical network to satisfy the high bandwidth and long distance requirements placed on transport network 108 due to increased traffic requirements by data networks 102a and 102b. Optical networks may provide higher bandwidth capability, and may also provide reduced signal distortion and loss over long distances versus other networks, such as wired electrical networks or wireless networks.

In the present embodiment, data networks 102a and 102b, however, may comprise wired electrical networks or wireless networks or other non-optical networks. Due to the reduced cost involved in implementing such networks versus implementing an optical network, non-optical networks may be advantageous in situations where the distance covered or the amount of bandwidth required is smaller and the cost/benefit advantage of optical networks may not be realized.

Although, data networks 102a and 102b are described as comprising non-optical networks and transport network 108 is described as comprising an optical network, these descriptions are for illustration only, and the present disclosure should not be limited to such. Due to various design considerations and network requirements, data networks 102a and 102b may also comprise optical networks and components, and transport network 108 may also comprise non-optical networks and components.

Network element 104a may convert electrical signals received from data network 102a into optical signals and transmit the signals via transmission media, through transport network 108 to network element 104b. Although not expressly shown, transport network 108 may include none, one, or more network elements that receive and transmit the optical signal before it reaches network element 104b. Network element 104b may convert the optical signals into electrical signals that may be transmitted through data network 102b.

Although the present disclosure describes electrical signals being converted to optical signals and optical signals being converted to electrical signals with respect to transmitting signals between data networks 102a and 102b and transport network 108, the present disclosure should not be limited to such.

For example, as optical signals travel through an optical network such as transport network 108, the optical signals may experience signal loss and distortion. Accordingly, at times the optical signals may need to be converted back to electrical signals, reconfigured to eliminate noise and distortion and retransmitted as optical signals. Thus, the present disclosure may relate to this or any other application where electrical signals are converted to optical signals.

Network elements 104 may be any system, apparatus or device that may be configured to route traffic through, to, or from a network. Examples of network elements 104 include routers, switches, and optical add-drop multiplexers (OADMs).

Transmission media within a network may comprise any system, device or apparatus configured to couple corresponding ports of nodes (e.g., network elements 104) to each other and transmit traffic between the corresponding ports. For example, a transmission medium may comprise an optical fiber, a T1 cable, a WiFi signal, a Bluetooth signal, or any other suitable medium.

In the present example, transmission media within transport network 108 may comprise optical fibers configured to carry optical signals. The optical fibers may comprise any suitable type of fiber, such as a Single-Mode Fiber (SMF), Enhanced Large Effective Area Fiber (E-LEAF), or True-Wave® Reduced Slope (TW-RS) fiber.

In system 100, optical signals transmitted within transport network 108 via optical fibers may comprise one or more channels (or wavelengths) that carry traffic. Increasing the number of channels within a signal increases the information carrying capacity (bandwidth) of the optical signal and the optical fiber carrying the optical signal. Thus, as the bandwidth requirements of a network increase, the need for optical signals to comprise more channels also increases.

The process of communicating information on multiple channels of a single optical signal may be referred to as wavelength division multiplexing (WDM). Dense wavelength division multiplexing (DWDM) refers to the multiplexing of a larger (denser) number of wavelengths, usually greater than forty, into a fiber.

Optical transmitters (also referred to as transmitters) may be configured to transmit a signal at a specific wavelength or channel. In Ethernet applications, each signal transmitted by a transmitter may correspond to an optical lane (also referred to as lanes). The number of transmitters and consequently lanes, and fibers needed may correspond with the bandwidth requirements of the application and the bandwidth capabilities of the optical components.

For example, an Ethernet system may require one terabit per second (1 TE) of bandwidth. The optical transmitters associated with the system may be capable of transmitting a signal along a channel at twenty-five (25) gibabits per second and WDM may be applied to four signals generated by four transmitters at four different channels to create a single optical signal that comprises the four channels and that is transmitted within a single optical fiber. Therefore, each optical fiber may comprise a bandwidth of one hundred (100) gigabits/second (4 channels×25 gigabits/second/channel=100 gigabits/second). Also, each optical fiber may correspond with four different lanes (1 lane/transmitter×4 transmitters=4 lanes).

To achieve the 1 TE bandwidth requirement, ten optical fibers may be required (10 fibers×100 gigabits/second=1000 gigabits/second (or 1 terabit/second)). In the present example, because each individual transmitter corresponds to a lane, each fiber carries corresponds with four transmitters and ten fibers are required, a 1 TE bandwidth optical signal may comprise forty (40) lanes (4 lanes/fiber×10 fibers=40 lanes).

In another example, if DWDM were used, a single fiber may carry a signal that comprises forty different signals at forty different channels created by forty different transmitters, with each channel having a bandwidth of twenty-five gigabits per second for a total bandwidth of 1 TE. A lane may be assigned to each transmitter, and therefore the 1 TE Ethernet application may still comprise forty lanes, but every lane may be within one fiber instead of dispersed within ten.

Although a 1 TE Ethernet application has been described as requiring forty lanes and either one or ten fibers, the number of lanes and fibers may be more or less depending on the bandwidth of the channels and the number of channels that may be multiplexed within one fiber. Further, other Ethernet applications requiring more or less bandwidth may require more or fewer lanes and fibers depending on the bandwidth of the channels and the number of channels that may be multiplexed within one fiber.

As shown by the above example, as the bandwidth requirements of Ethernet increase, the number of optical lanes required to support the bandwidth requirements may also increase. The aggregate number of lanes required to support the bandwidth requirements may create a link between network elements. For example, in the embodiment described above, a 1 TE link may comprise forty optical lanes.

As the number of lanes increases, the likelihood that one of the lanes will experience a failure or other problem—typically due to failure of a transmitter associated with the lane—also increases. Therefore, implementing a system that may maintain connectivity of a link when a lane associated the link fails may be advantageous in optical networks that utilize a large number of lanes.

Network elements 104 may be configured to determine the availability of lanes within a link and distribute signals accordingly by bypassing unavailable lanes and utilizing available lanes. Therefore, when a lane fails, network elements 104 may continue transmitting traffic utilizing the lanes that are still available and maintain the connectivity of links, instead of determining that the entire link is down due to some but not all of the lanes being unavailable.

Modifications, additions, or omissions may be made to system 100 without departing from the scope of the disclosure. For example, a system 100 may include more than two network elements 104 and need not necessarily comprise two data networks and a transport network. Further, although system 100 depicts a point to point network, system 100 may also comprise a ring network, a mesh network, or any other suitable network or combination of networks. The present disclosure may apply wherever optical communications are used.

Figure 2:
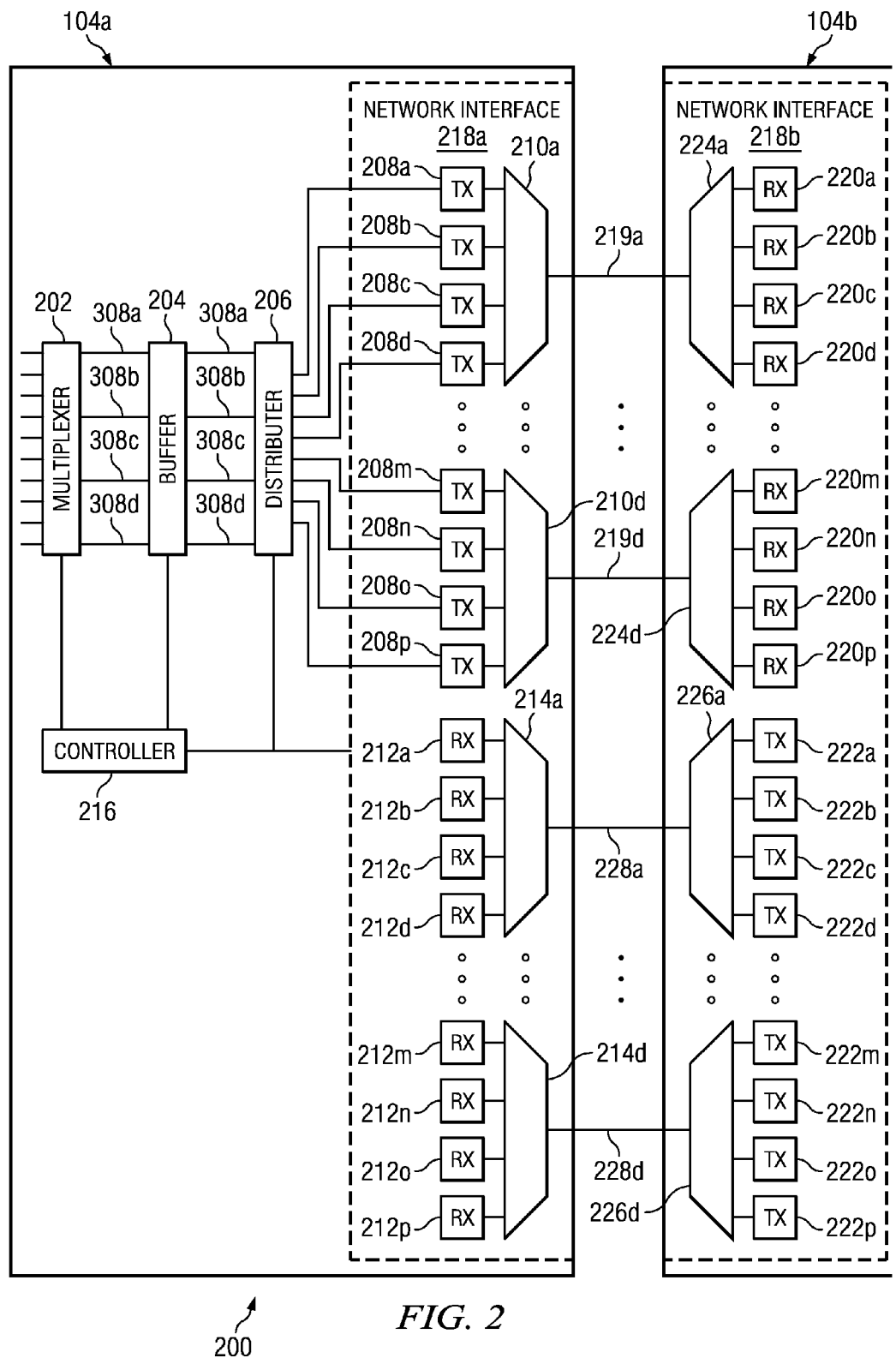
FIG. 2 illustrates an example system configured to distribute signals to be transported through an optical network according to lane availability.

FIG. 2 illustrates an example system 200 configured to distribute signals to be transported through an optical network according to lane availability. In the present example, system 200 may comprise network elements 104a and 104b, such as those depicted in FIG. 1. Network element 104a may include a plurality of components, including but not limited to, a multiplexer 202, a buffer 204, a distributor 206, a controller 216, and a network interface 218a that may include optical transmitters (Tx) 208a-208p, optical multiplexers 210a-210d, optical receivers (also referred to as receivers) (Rx) 212a-212p and optical demultiplexers 214a-214d.

Network element 104b may include network interface 218b, which may include optical receivers (Rx) 220a-220p, optical demultiplexers 224a-224d, optical transmitters (Tx) 222a-222p, and optical multiplexers 226a-226d.

Optical fibers 219a-219d may communicatively couple network elements 104a and 104b via optical multiplexers 210a-210d and optical demultiplexers 224a-224d, and optical fibers 228a-228d may also communicatively couple network elements 104a and 104b via optical multiplexers 226a-226d and optical demultiplexers 214a-214d. Network element 104a may transmit traffic to network element 104b via optical fibers 219a-219b and network element 104b may transmit traffic to network element 104a via optical fibers 228a-228d.

Multiplexer 202 may be configured to receive a plurality of input signals and combine those input signals into a smaller number of output signals. In the present example, multiplexer 202 may combine ten input signals into four output signals, but the present disclosure should not be limited to such. Any number of input signals may be converted to any number of output signals depending on the capabilities and properties of a specific system.

It may be advantageous to combine a plurality of input signals into a different number of output signals. One reason for doing this may be that the optical networks may have higher bandwidth capabilities than an electrical network providing the input signal, and thus multiple electrical signals may be combined into a smaller number of optical signals. Further, input signals may be combined so that the bandwidth requirements of the output signals may correspond with the bandwidth capabilities of an optical fiber. By combining the input signals into output signals with the same bandwidth as the optical fibers, the output signals may be properly and easily distributed among the appropriate number of fibers.

In the present example, the ten input signals may comprise an aggregate bandwidth requirement of four hundred (400) gigabits per second and each fiber 219 may have a bandwidth capability of one hundred gigabits per second. Therefore, four fibers 219 (fibers 219a-219d) may be required to satisfy the bandwidth requirements of the ten input signals. Thus, the ten input signals may be combined into four output signals, with each output signal comprising a bandwidth requirement of one hundred gigabits per second. Each output signal may be distributed to an individual fiber 219 with the same bandwidth capabilities as the output signal's bandwidth requirements.

Figure 3:
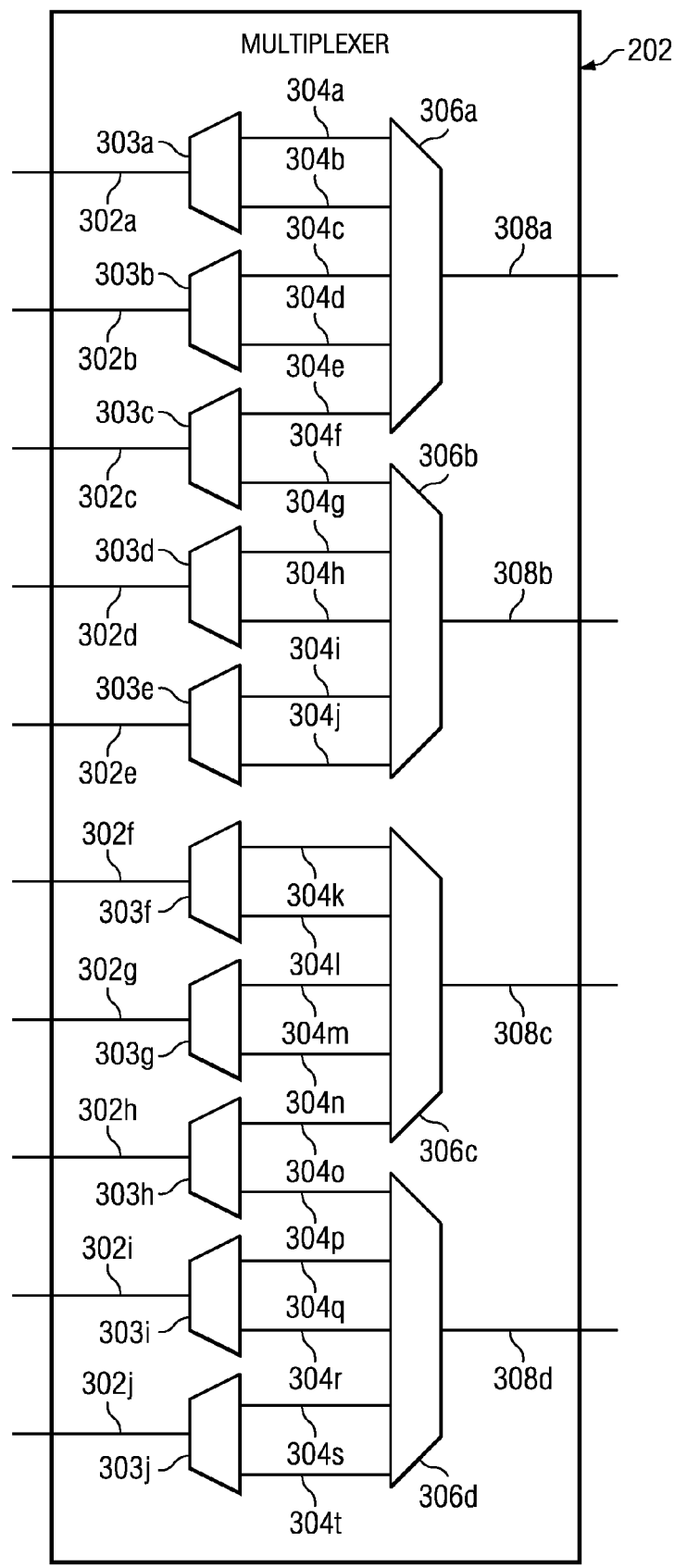
FIG. 3 illustrates an example system configured to combine a plurality of input signals into a plurality of output signals.

FIG. 3 illustrates an example system 300 configured to combine a plurality of input signals into a plurality of output signals that may be implemented in multiplexer 202. A system similar to system 300 may be found in IEEE standard 802.3-2008. In the example embodiment, ten input signals may be combined into four output signals. System 300 may comprise input signals 302a-302j, which may be sent to demultiplexers 303a-303j included in system 300. Demultiplexers 303a-303j may split each input signal 302 into two intermediate signals 304, thus creating intermediate signals 304a-304t.

Intermediate signals 304a-304t may be divided into four groups of five intermediate signals. For example, group one may comprise intermediate signals 304a-304e, group two may comprise intermediate signals 304f-304j, group three may comprise intermediate signals 304k-304o, and group four may comprise intermediate signals 304p-304t.

Each group of intermediate signals may be sent to a multiplexer 306 (e.g., group one to multiplexer 306a, group two to multiplexer 306b, group three to multiplexer 306c and group four to multiplexer 306d). Multiplexers 306a-306d may combine each group of intermediate signals 304 into an output signal 308, thus creating output signals 308a-308d. Accordingly, ten input signals (input signals 302a-302j) may be combined into four output signals (output signals 308a-308d) through a series of demultiplexers and multiplexers.

After the input signals are combined into the output signals, the output signals may be distributed for transportation through an optical network.

Modifications, additions, or omissions may be made to system 300 without departing from the scope of the disclosure. For example, although ten input signals are depicted as being multiplied into twenty intermediate signals which are then combined into four output signals, any number of input signals may be combined into any number of output signals depending on the system characteristics. Further, a system may or may not have intermediate signals or multiple sets of multiplexers and demultiplexers and still be within the scope of the disclosure.

Returning to FIG. 2, output signals 308a-308d from multiplexer 202 may then go to buffer 204 communicatively coupled to multiplexer 202. Buffer 204 may temporarily store output signals 308a-308d as output signals 308a-308d wait to be distributed via distributor 206 and converted into optical signals. Buffer 204 may comprise any suitable system, apparatus or device, configured to temporarily store the output signal.

Distributor 206 may distribute output signals 308a-308d to optical transmitters 208a-208p included in network interface 218a. Optical transmitters 208a-208p may be any system, apparatus or device configured to convert an electrical signal into an optical signal to be transmitted throughout an optical network via an optical medium such as an optical fiber. For example, optical transmitters 208a-208p may each comprise a laser and a modulator configured to receive electrical input signals, and modulate the information contained in the input signals onto the wavelength or channel of light produced by the laser.

Each optical transmitter 208 may transmit a signal at a specific wavelength or channel. The signals sent by four transmitters 208 may be sent to one optical multiplexer 210. An optical multiplexer 210 may apply WDM to the four signals and combine the four signals into one signal to be transmitted over one fiber 219. Thus, four transmitters 208 may correspond with one optical multiplexer 210 and one fiber 219a (e.g. transmitters 208a-208d to optical multiplexer 210a and fiber 219a, transmitters 208e-208h to optical multiplexer 210b and fiber 219b (not expressly shown) etc.).

Because each output signal 308 may correspond with each fiber 219, distributor 206 may distribute each output signal to the transmitters 208 that correspond with a fiber 219 (e.g., output signal 308a to transmitters 208a-208d, output signal 308b to transmitters 208e-208h, etc.).

Distributor 206 may be configured to distribute output signals 308a-308d to optical transmitters 208a-208p based on the availability of each optical transmitter 208 associated with a lane. As described above, each signal sent by an optical transmitter 208 may correspond to an optical lane. The present example may comprise sixteen transmitters 208 transmitting sixteen different signals (transmitters 208a-208p) and therefore, may comprise sixteen different lanes.

Distributor 206 may allow output signals 308 to be distributed among transmitters 208 without losing an output signal 308 or portion of an output signal 308 if a transmitter 208 associated with the output signal 308 is lost. Since transmitters 208 are not directly coupled to output signals 308, distributor 206 may reallocate all of an output signal 308 to available transmitters 208 if a particular transmitter 208 associated with that output signal fails. Otherwise, if a transmitter 208 were directly coupled to an output signal 308 or a portion of an output signal 308, and if that transmitter 208 were lost, the output signal 308 or portion of output signal 308 directly associated with the lost transmitter 208 may also be lost.

Distributor 206 may distribute output signals 308a-308d to transmitters 208 according to the availability of lanes associated with a fiber 219 that is associated with a particular output signal 308 (e.g., output signal 308a to transmitters 208a-208d to be transmitted over fiber 219a). In alternative embodiments, a particular output signal 308 may not be associated with a particular fiber 219, and distributor 206 may distribute output signals 308a-308d to transmitters 208a-208p according to the availability of every lane associated with transmitters 208a-208p without associating specific lanes with specific output signals 308.

Further, in embodiments where an output signal 308 is typically associated with a particular fiber 219, if a certain number or percentage of transmitters 208 associated with a fiber 219 are lost, distributor 206 may be configured to distribute all or part of the output signal 308 associated with that fiber 219 among transmitters 208 not associated with that fiber 219. For example, output signal 308a may be associated with fiber 219a and may distribute output signal 308a exclusively among transmitters 208a-208d. Transmitters 208a-208c may fail and distributor 206 may now distribute output signal 308a among transmitters 208d-208p, thus output signal 308a may not be associated with fiber 219a anymore.

Distributor 206 may be any system, device or apparatus configured to distribute a signal to a plurality of optical transmitters. As an example, distributor 206 may be a router configured to take an input signal and send all or part of the input signal to a specific location.

Network interfaces 218a and 218b may serve as an interface between network elements 104a and 104b. Network interface 218a may comprise transmitters 208, optical multiplexers 210, receivers 212 and optical demultiplexers 214. Network interface 218a may also be configured to monitor, manage and control these components and serve as an interface between these components and other components included in network element 104a. Network interface 218b may comprise similar components as network interface 218a such as receivers 220a-220p, optical demultiplexers 224a-224d, transmitters 222a-222p and optical multiplexers 226a-226d and may perform similar operations also.

Network interfaces 218a and 218b may facilitate communication between network elements 104a and 104b. Transmitters 208, optical multiplexers 210, optical demultiplexers 224 and receivers 220 may facilitate communication from network element 104a to network element 104b. Network interface 218a may comprise the same number of transmitters 208 as receivers 220 comprised in network interface 218b. Each receiver 220 may correspond with a transmitter 208 and may be configured to receive the signal transmitted by its corresponding transmitter 208. Optical demultiplexers 224 may be configured to separate the signals combined by optical multiplexers 210 so that each receiver 220 may receive the signal transmitted by its respective transmitter 208. Transmitters 222, optical multiplexers 226, optical demultiplexers 214 and receivers 212 may perform similar operations to facilitate communication from network element 104b to network element 104a.

Network interfaces 218a and 218b may also include a controller (not expressly shown) with logic stored on memory and configured to monitor the transmitters, receivers and multiplexers for errors in the signals sent through the components or for failures of the actual components. Thus, network interfaces 218a and 218b may monitor lanes by monitoring the transmitters, receivers, optical multiplexers, optical demultiplexers, and fibers associated with the lanes.

Network interfaces 218a and 218b may comprise any system, apparatus or device configured to receive input, send output, process the input or output, or perform other suitable operations.

Controller 216 may be communicatively coupled to network interface 218a via a controller included in network interface 218a. If network interface 218a does not include a controller, controller 216 may be communicatively coupled to the components within network interface 218. Controller 216 may also be communicatively coupled to distributor 206, buffer 204 and multiplexer 202. Controller 216 may comprise logic stored in a computer readable medium such as memory. The logic may be configured to control the operations and functions of controller 216. Controller 216 may comprise any system, apparatus or device configured to store logic and perform operations according to that logic.

Controller 216 may determine the availability status of the lanes for carrying the output signal as an optical signal. For example, in an embodiment where each output signal 308 may correspond to a fiber 219, transmitter 208a may fail, but transmitters 208b-208d may still be available for transmitting output signal 308a over fiber 219a. Controller 216 may determine an availability status that indicates that the lane associated with transmitter 208a is unavailable for carrying traffic because transmitter 208a is unavailable for transmitting a signal. But, Controller 216 may also determine that the lanes associated with optical transmitters 208b-208d are still available for carrying traffic over fiber 219a.

In an alternative embodiment, output signals 308 may not correspond to any particular fiber 219. Transmitter 208a may fail, but transmitters 208b-208p may still be available for transmitting output signals 308 over fibers 219. Controller 216 may determine an availability status that indicates that the lane associated with transmitter 208a is unavailable for carrying traffic, but that the lanes associated with transmitters 208b-208p are still available for carrying traffic over fibers 219.

In one embodiment, controller 216 may determine that an optical transmitter, such as optical transmitter 208a, has failed by receiving a message from network element 104b. If optical transmitter 208a fails, optical receiver 220a in network element 104b may not receive any incoming signals from optical transmitter 208a. Network element 104b may determine, using a controller (not expressly shown), that the lane associated with transmitter 208a has failed. Network element 104b may send a message indicating this failure to optical receiver 212a included in network element 104a via optical transmitter 222a. A controller within network interface 218a may forward the message to controller 216 and controller 216 may determine that the lane associated with optical transmitter 208a is unavailable for carrying traffic. If network interface 218a does not include a controller, controller 216 may be communicatively coupled to receiver 212a and may directly receive the message from network element 104b.

In alternative embodiments, controller 216 may be configured to directly monitor transmitters 208a-208p for failures or a controller included in network interface 218a may monitor transmitters 208a-208p and convey the availability of transmitters 208a-208p to controller 216. Controller 216 may also be configured to monitor optical transmitters 222a-222p and optical receivers 212a-212p for failures and report those failures to network element 104b.

After determining that optical transmitter 208a has failed and after updating the lane availability status to indicate such, controller 216 may direct distributor 206 to not distribute any portion of any output signal 308 to optical transmitter 208a. However, controller 216 may direct distributor 206 to continue distributing output signals 308 to transmitters 208b-208d, or transmitters 208b-208p depending on the configuration, because the lanes associated with those transmitters may still be available. Therefore, the link between network elements 104a and 104b may maintain connectivity, even though the traffic carrying capabilities of the link may be reduced by the loss of the lane associated with optical transmitter 208a.

Controller 216 may also be configured to generate a message to indicate that the link that includes optical transmitter 208a has reduced signal carrying capacity due to the loss of the lane associated with optical transmitter 208a. Controller 216 may send this message throughout the networks that may send input signals to multiplexer 202, such as data network 102a depicted in FIG. 1, to notify the appropriate network administration systems. Thus, the network administrators may attend to the problem accordingly by, for example, sending a smaller amount of input data to network element 104a via multiplexer 202.

Although the present embodiment helps maintain connectivity of a link when a lane associated with the link fails, after a certain threshold percentage of lanes fail, controller 216 may also be configured to determine that the link has lost sufficient connectivity to determine that the link has failed. In some embodiments, the threshold percentage may be between twenty-five to thirty-five percent of the lanes associated with a link.

In the present embodiment, the threshold percentage may be thirty percent, and consequently controller 216 may determine that a link has failed if more than thirty percent of the lanes associated with the link have failed. For example, in the present embodiment, system 200 may utilize sixteen lanes to establish the link between network elements 104a and 104b. If one lane fails, six and one quarter percent of the lanes have failed, and the link may maintain connectivity. If four lanes fail, twenty-five percent of the lanes have failed and the link may still maintain connectivity. But, if five lanes fail, a little over thirty-one percent of the lanes have failed, and controller 216 may determine that the link has failed.

After determining that the link has failed, controller 216 may generate a message indicating such and have that message distributed throughout any networks that may send input signals to multiplexer 202, such as data network 102a. If network element 104a sends a message indicating that the link has failed, network administrators and managers may address the failed link accordingly, such as by rerouting signals to bypass the failed link or attempting to fix the problems and restore connectivity to the link.

In another embodiment, controller 216 may be configured to determine that at least one previously unavailable optical lane is now available. For example, a defective optical transmitter 208a may be replaced and the unavailable lane associated with optical transmitter 208a may now be available for transmitting traffic. Controller 216 may determine that the lane is available and that traffic may be distributed to optical transmitter 208a again. Controller 216 may determine that the lane is available by receiving a message from network element 104b, by receiving the message from another network element within the network, or by directly monitoring optical transmitter 208a, which is associated with the failed lane.

After determining that a previously unavailable lane is now available for transmitting traffic, controller 216 may transmit a signal throughout the network to notify the appropriate network administration systems that the lane is now available. Thus, increased levels of input traffic may be sent to multiplexer 202 to be transmitted along the link associated with optical transmitters 208a-208p because more lanes (e.g. optical transmitters) associated with the link may be available.

Modifications, additions, or omissions may be made to system 200 without departing from the scope of the disclosure. For example, although system 200 has been depicted with ten input signals, converted to four output signals which in turn may be distributed among sixteen optical transmitters and lanes, and four fibers, any number of input signals, output signals or optical lanes and optical transmitters may be utilized without departing from the scope of the disclosure. Additionally, although not expressly shown, network element 104b may include the components the same as or similar to those depicted in network element 104a.

Further, although multiplexer 202, buffer 204, distributor 206, controller 216 and network interface 218a are depicted as separate components of network element 104a, the functionality of each of these components may be combined into fewer components or distributed among more components than those depicted. For example, each component may include a controller 216 that controls the functionality of that component, instead of having a single controller 216 that controls the functionality of all the components depicted.

Figure 4:
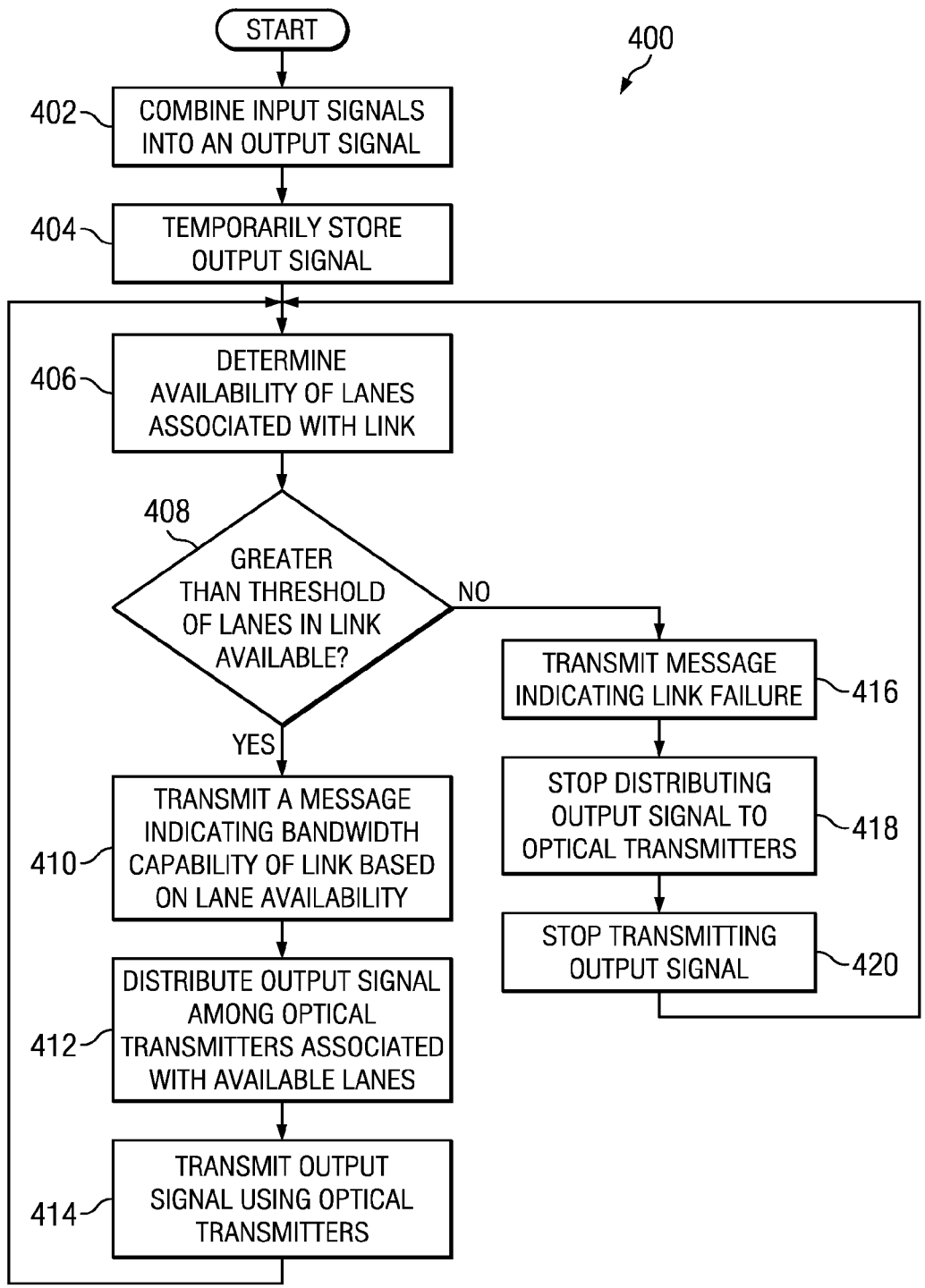
FIG. 4 illustrates an example of a method for distributing signals in an optical network according to lane availability.

FIG. 4 illustrates an example of a method 400 for distributing signals in an optical network according to lane availability.

Method 400 may start, and at step 402, a network element may combine a plurality of input signals into one or more output signals. At step 404, the network element may temporarily store the output signals using a buffer or other suitable system, apparatus or device.

At step 406, the network element may determine an availability status of optical lanes associated with an optical link that may communicatively couple the network element to another network element. The availability status may indicate which lanes associated with the link may be available for transmitting the output signals as one or more optical signals throughout an optical network.

At step 408, the network element may determine if the number of available lanes associated with the link is greater than a threshold percentage or number of total lanes associated with that link. If the number of available lanes is greater than the threshold percentage or number, method 400 may proceed to step 410. If the number of available lanes is less than the threshold percentage or number, method 400 may proceed to step 416.

At step 410, the network element may transmit a message indicating the bandwidth capability of the link based on the availability of lanes associated with the link. Thus signals with an appropriate bandwidth requirement may be sent to the network element according to the bandwidth capacity of the link.

At step 412, the network element may distribute the output signals among optical transmitters associated with the available lanes. Although depicted in a certain order, steps 410 and 412 may be performed simultaneously or in a different order.

At step 414, the network element may transmit the output signals using the available optical transmitters, and the method may return to step 406 to determine the availability of the lanes in case the availability status has changed.

If the network element determines at step 408 that less than the threshold number or percentage of lanes associated with the link are not available, the network element may transmit a message indicating link failure at step 416. Thus, a network administrator may stop transmitting traffic to the link, replace the network element, network interfaces, transmitters or other components associated with the failed link, perform any other operation to repair the link or lanes associated with the link, or do any combination thereof.

At step 418, the network element may stop distributing output signals to the transmitters associated with the failed link and at step 420, the network element may stop transmitting the output signal.

Following step 420, method 400 may return to step 406 to determine lane availability of the lanes associated with the link in case a problem associated with the link or lanes associated with the link is repaired to the degree that traffic may be transmitted through the link again. Method 400 may continue in a loop until terminated by some outside influence.

Modifications, additions or omissions may be made to method 400 without departing from the scope of the disclosure. For example, method 400 may include more or fewer steps than those depicted. Further, multiple steps may be combined into a single step, or single steps may be expanded into more than one step.

Although the present disclosure and its advantages have been described in detail, it should be understood that various changes, substitutions and alterations can be made herein without departing from the spirit and scope of the invention as defined by the following claims.

What is claimed is:

1. A method for distributing signals in an optical network comprising:
    combining, by a network element, a plurality of input signals into a different plurality of output signals;
    determining, by the network element, an availability status of a plurality of optical lanes for carrying the output signals;
    distributing, by the network element, the output signals at the same time across all of a plurality of optical transmitters associated with the plurality of optical lanes if the availability status indicates that all of the plurality of optical lanes are available, wherein the plurality of optical transmitters are greater in number than the plurality of output signals when all of the plurality of optical lanes are available;
    transmitting, by the network element, the output signals as optical signals at the same using all of the plurality of optical transmitters associated with the lanes that are available, such that the plurality of optical transmitters transmitting the output signals are greater in number than the plurality of output signals;
    determining that at least one previously available optical lane is not available for carrying the output signals;
    terminating distribution of the output signals to at least one optical transmitter associated with the at least one lane that is not available for carrying the output signals; and
    redistributing, by the network element, all of the output signals at the same time across all of the plurality of optical transmitters associated with the lanes that are still available.

2. The method of claim 1, further comprising:
    receiving, by the network element, a message from another network element indicating that at least one previously available optical transmitter is not available for transmitting the output signals; and
    updating, by the network element, the availability status to indicate that at least one previously available lane associated with the at least one previously available optical transmitter is no longer available for carrying the output signals.

3. The method of claim 1, further comprising transmitting, by the network element, a message indicating a reduced signal carrying capacity due to the at least one previously available lane not being available.

4. The method of claim 3, further comprising receiving, by the network element, the plurality of input signals based on the reduction in the number of optical lanes that are available for carrying the output signals.

5. The method of claim 1, further comprising determining that at least one previously unavailable lane is now available for carrying the output signals; and
updating, by the network element, the availability status to indicate that the at least one previously unavailable lane is now available for carrying the output signals.

6. The method of claim 5, further comprising transmitting, by the network element, a message indicating an increased signal carrying capacity due to the at least one previously unavailable lane being available.

7. The method of claim 6, further comprising receiving, by the network element, the plurality of input signals based on the increased signal carrying capacity.

8. The method of claim 1, further comprising transmitting, by the network element, a message indicating failure of a link comprising the plurality of lanes if the availability status indicates that greater than a threshold of the plurality of lanes are not available.

9. The method of claim 1, further comprising, stopping transmission of the output signals if the availability status indicates that greater than a threshold of the plurality of lanes associated with a link are not available.

10. A network element comprising:
a multiplexer configured to combine a plurality of input signals into a different plurality of output signals;
a network interface comprising a plurality of optical transmitters associated with a plurality of optical lanes and configured to transmit the output signals as optical signals;
a processor, communicatively coupled to the multiplexer and the network interface, the processor configured to determine an availability status, for carrying the output signals, of the plurality of lanes; and
a distributor communicatively coupled to the processor and plurality of optical transmitters, wherein the plurality of optical transmitters are greater in number than the plurality of output signals when all of the plurality of optical lanes are available, the distributor configured to:
distribute the output signals at the same time across all of the plurality of optical transmitters if the availability status indicates that all of the plurality of optical lanes associated with the plurality of optical transmitters are available, such that the plurality of optical transmitters to which the output signals are distributed are greater in number than the plurality of output signals;
terminate distributing the output signals to one or more of the plurality of optical transmitters if the processor determines that one or more optical lanes associated with the one or more optical transmitters is no longer available for carrying the output signals; and
redistribute all of the output signals at the same time across all of the plurality of optical transmitters associated with the lanes that are still available.

11. The network element of claim 10, wherein the network interface is configured to receive a message from another network element indicating that at least one previously available optical transmitter is not available for transmitting the output signals.

12. The network element of claim 11, wherein the processor is further configured to update the availability status to indicate that at least one previously available lane associated with the at least one previously available optical transmitter is no longer available for carrying the output signals based on the message received from the other network element.

13. The network element of claim 10, wherein the processor is further configured to generate a message indicating a reduced signal carrying capacity due to the at least one previously available optical lane not being available, the processor directing the message to be transmitted via the network interface.

14. The network element of claim 13, wherein the multiplexer receives the plurality of input signals based on a reduction in the number of optical lanes that are available for carrying the output signals.

15. The network element of claim 10, wherein the processor is configured to determine that at least one previously unavailable lane is now available for carrying the output signals.

16. The network element of claim 15, wherein the processor is further configured to update the availability status to indicate that the at least one previously unavailable lane is now available for carrying the output signals.

17. The network element of claim 15, wherein the processor is further configured to generate a message indicating an increased signal carrying capacity due to the at least one previously unavailable lane now being available, the processor directing the message to be transmitted via the network interface.

18. The network element of claim 17, wherein the multiplexer receives the plurality of input signals based on the increased signal carrying capacity.

19. The network element of claim 10, wherein the processor is further configured to generate a message indicating failure of a link associated with the plurality of lanes if the availability status indicates that greater than a threshold of the plurality of lanes are not available, the processor directing the message to be transmitted via the network interface.

20. The network element of claim 10, wherein the processor is further configured to stop transmission of the output signals if the availability status indicates that greater than a threshold of the plurality of lanes associated with a link are not available.

* * * * *